United States Patent

Sato et al.

[11] Patent Number: 5,227,447
[45] Date of Patent: Jul. 13, 1993

[54] PREPARATION OF HIGH MOLECULAR WEIGHT ORGANOPOLYSILOXANE

[75] Inventors: Shinichi Sato; Takashi Matsuda; Toshio Takago, all of Annaka, Japan

[73] Assignee: Shin-Etsu Chemical Co., Ltd., Tokyo, Japan

[21] Appl. No.: 925,194

[22] Filed: Aug. 6, 1992

Related U.S. Application Data

[63] Continuation-in-part of Ser. No. 623,678, Dec. 6, 1990, abandoned.

[30] Foreign Application Priority Data

Dec. 7, 1989 [JP] Japan .................................. 1-318626

[51] Int. Cl.$^5$ .................................. C08G 77/06
[52] U.S. Cl. .................................. 528/12; 528/26; 528/33; 556/442
[58] Field of Search .................................. 528/12, 33, 26; 556/442

[56] References Cited

U.S. PATENT DOCUMENTS 3,032,530  5/1962  Falk .
3,155,634  11/1964  Pike .................................. 528/12
3,280,214  10/1966  Mitchell .................................. 528/33
3,812,081  5/1974  Dennis et al. .
3,903,047  9/1975  Ashby .................................. 528/12

FOREIGN PATENT DOCUMENTS 0119092  9/1984  European Pat. Off. .
0133975  3/1985  European Pat. Off. .

OTHER PUBLICATIONS

Patent Abstracts of Japan, vol. 10, No. 136 (C-347) (2193), May 20, 1986 and JP-A-60 262 826, Dec. 26, 1985, M. Morita, "High Molecular Weight Polydiphenylsiloxane and Its Production".

Primary Examiner—Melvyn I. Marquis
Attorney, Agent, or Firm—Oblon, Spivak, McClelland, Maier & Neustadt

[57] ABSTRACT

The process for preparing a high molecular weight organopolysiloxane comprises subjecting a hydroxyl-containing organosiloxane, as a starting material, to a dehydration condensation reaction in the presence of an acidic compound selected from the acidic compounds represented by the following general formulas (1) and (2):

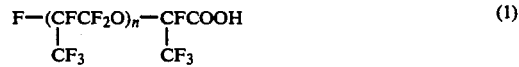

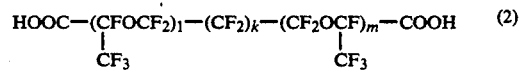

wherein in the formulas n is an integer of from 1 to 10, k is an integer of from 0 to 8, and l and m are each an integer of 0 or above, with l+m being in the range from 1 to 10. The process is advantageous over the conventional methods in that compounds having toxicity or the like are neither used nor by-produced. The process also has the merit of easy control of the molecular weight of the intended organopolysiloxane.

5 Claims, 1 Drawing Sheet

PREPARATION OF HIGH MOLECULAR WEIGHT ORGANOPOLYSILOXANE

This is a continuation-in-part application of Ser. No. 07/623,678 filed Dec. 6, 1990 now abandoned.

BACKGROUND OF THE INVENTION

1. Field of the Invention

This invention relates to a process for preparing a high molecular weight organopolysiloxane by use of a hydroxyl-containing organosiloxane as a starting material.

2. Description of the Prior Art

Methods of lengthening the molecular chain of hydroxyl-containing organosiloxanes by use of various silane compounds have been known.

For instance, U.S. Pat. No. 3,776,934 discloses a method in which methylvinylbis(N-methylacetamido)-silane is reacted with an organopolysiloxane blocked by hydroxyl group at both ends thereof to form a silicone elastomer composition which is curable at room temperature.

Also, Japanese Patent Publication No. 55-49623 (1980) discloses a method of obtaining a hydroxyl-containing organosiloxane with an increased molecular weight by mixing a hydroxyl-containing organosiloxane with methylvinylbis(e-caprolactamo)silane.

Furthermore, Japanese Patent Publication No. 61-12932 (1986) discloses a method in which a hydroxyl-containing organosiloxane, a cyclosiloxane having two vinyloxy groups bonded thereto and a guanidine derivative are mixed together to form a hydroxyl-containing organosiloxane with an increased molecular weight.

According to the above methods of the prior art, however, an amide or caprolactam having toxicity or odor is by-produced or there is need to use a cyclosiloxane which is difficult to synthesize. Therefore, the methods of the prior art are not so high in practicability.

It is disclosed in U.S. Pat. No. 3,155,634 that a polyorganosiloxane with an increased molecular weight is obtainable by condensation of siloxanes in the presence of a fluorine-containing aliphatic carboxylic acid as a condensation catalyst. However, such a fluorine-containing aliphatic carboxylic acid as disclosed in the U.S. patent is low in capability as condensation catalyst. Therefore, the method disclosed in the U.S. patent has the disadvantage that the condensation reaction must be carried out at high temperature for a long time, and has problems yet to be solved before the method can be used, particularly for preparation of high molecular weight organopolysiloxanes.

SUMMARY OF THE INVENTION

Accordingly, it is an object of this invention to provide a process for preparing a high molecular weight organopolysiloxane by which the drawbacks of the prior art as mentioned above are overcome and which is extremely high in practicability.

According to this invention, there is provided a process for preparing a high molecular weight organopolysiloxane which comprises subjecting an organosiloxane having at least one Si-bonded hydroxyl group in one molecule thereof to a condensation reaction in the presence of an acidic compound selected from the acidic compounds represented by the following general formulas (1) and (2):

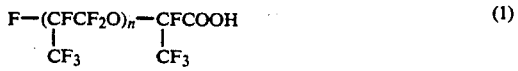

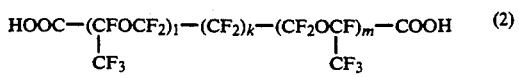

wherein in the formulas n is an integer of from 1 to 10, k is an integer of from 0 to 8, and 1 and m are each an integer of 0 or above, with 1+m being in the range from 1 to 10, in an amount of 0.001 to 10 parts by weight per 100 parts by weight of the organosiloxane.

That is, in the process of this invention, a dehydration condensation reaction represented by the following formula:

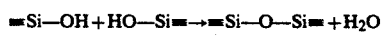

proceeds in the presence of the aforementioned acidic compound as a catalyst, whereby the molecular chain of the organosiloxane is lengthened, resulting in the formation of an organopolysiloxane with an increased molecular weight.

According to the process of this invention, the acidic compound used as a catalyst can be removed easily, and it is possible to control, as desired, the viscosity (equivalent or corresponding to molecular weight) of the intended hydroxyl-containing organopolysiloxane by regulating the reaction time or the reaction temperature.

In the process of the invention, furthermore, compounds having toxicity or odor are neither used nor by-produced. Therefore, the process is extremely high in practicability.

DETAILED DESCRIPTION OF THE INVENTION

Hydroxyl-containing organosiloxane

Figure 1:
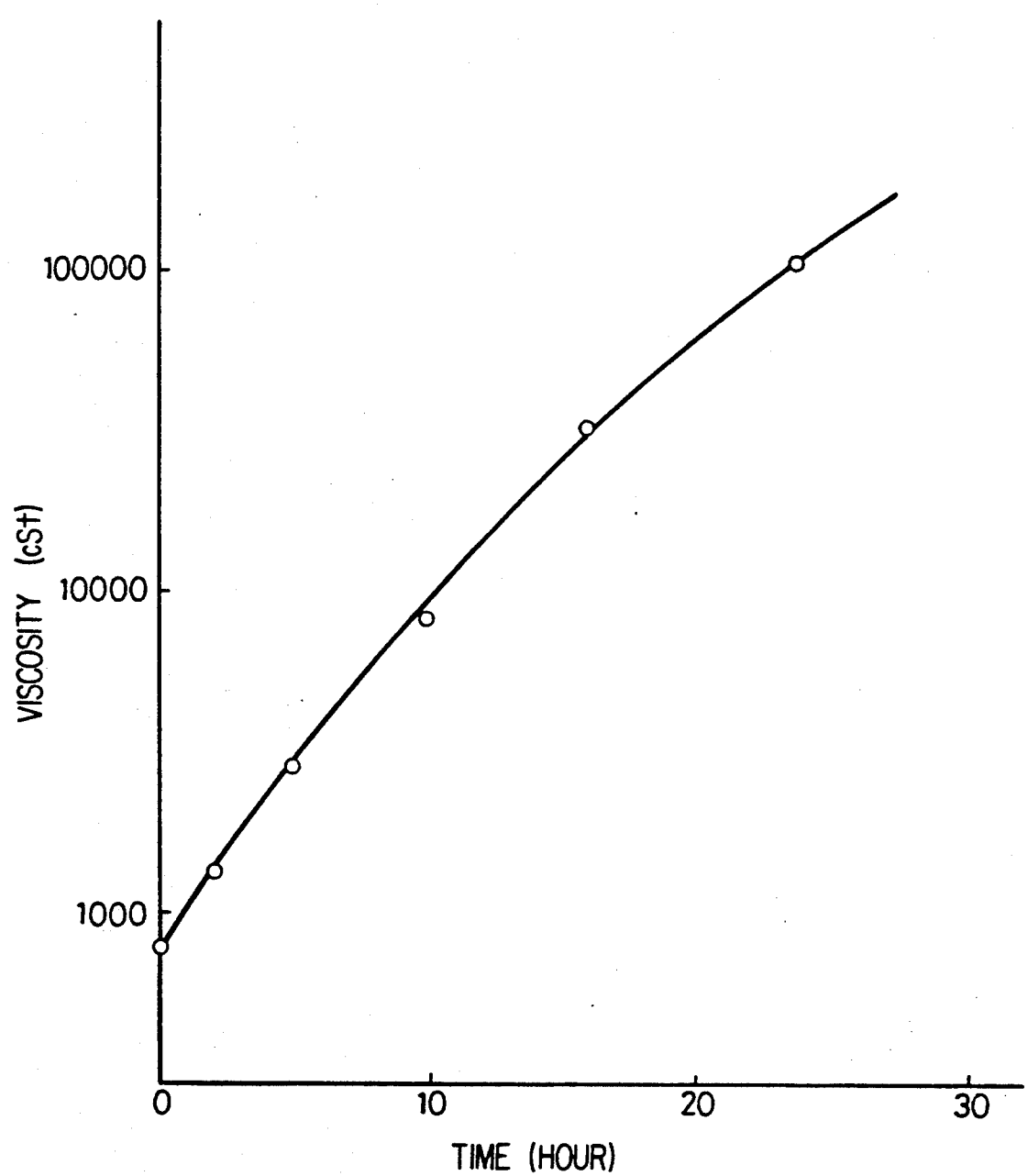
FIG. 1 is a diagram showing the relationship between viscosity and reaction time, for an organopolysiloxane produced by the reaction in Example 1 below.

As the starting material in this invention, an organosiloxane having at least one Si-bonded hydroxyl group in one molecule thereof is used.

The organosiloxane is not particularly limited in structure, so far as it has at least one hydroxyl group as mentioned above and the aforementioned dehydration condensation reaction is performed effectively. For instance, the organosiloxane may be a homopolymer or a copolymer, and may also be a mixture of various polymers. Further, the structural unit of the organosiloxane may be a monoorganosiloxane unit, a diorganosiloxane unit, a triorganosiloxy unit or a combination of these units. Organic groups bonded to silicon atoms may be any of monovalent hydrocarbon groups, monovalent halogenated hydrocarbon groups and monovalent cyanohydrocarbon groups. Generally, the monovalent hydrocarbon groups which can be used include, for example, methyl, ethyl, propyl, hexyl, octadecyl, vinyl, allyl, cyclohexyl, cyclohexenyl, phenyl, etc., whereas the monovalent halogenated hydrocarbon groups usable include, for example, chloromethyl, 3-chloropropyl, 3,3,3-trifluoropropyl, $\alpha,\alpha,\alpha$-trifluorotolyl, chlorobenzyl, bromopropyl, etc., and the monovalent cyanohydrocarbon groups usable include, for example, cyanoethyl, cyanopropyl, etc. Of these groups, particularly preferred for use in this invention are methyl, vinyl, phenyl, and 3,3,3-trifluoropropyl.

In this invention, furthermore, it is desirable that the Si-bonded hydroxyl group is present at an end of the molecular chain of the organosiloxane, and it is particularly preferable that the organosiloxane is blocked by hydroxyl group at both ends of the molecular chain thereof, in view of rapid progress of the dehydration condensation reaction.

Acidic compound

The acidic compound to be mixed with the hydroxyl-containing organosiloxane in this invention is an acidic compound selected from the acidic compounds of the above general formulas (1) and (2).

Specific examples of such acidic compound include, but are not limited to, the following compounds.

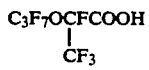

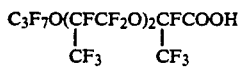

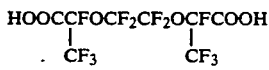

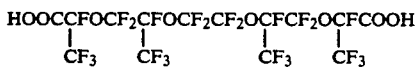

These compounds may be used singly or in combination of two or more.

Such acidic compounds are higher in capability as condensation catalyst than fluorine-containing aliphatic carboxylic acids such as those disclosed in the U.S. Pat. No. 3,155,634. Therefore, the acidic compounds as above are capable of causing a condensation reaction between siloxanes to take place at low temperature in a short time. Accordingly, the acidic compounds are extremely suited to preparation of high molecular weight organopolysiloxanes.

The acidic compound as mentioned above is used in an amount of 0.001 to 10 parts by weight, preferably 0.1 to 1.0 part by weight, per 100 parts by weight of the hydroxyl-containing organosiloxane. If the amount of the acidic compound used is less than 0.001 part by weight, the intended dehydration condensation reaction progresses little. On the other hand, use of the acidic compound in an amount of more than 10 parts by weight does not produces any additional effect and is, rather, disadvantageous on an economical basis.

Dehydration condensation reaction

In this invention, the dehydration condensation reaction between the molecules of the hydroxyl-containing organosiloxane is caused to proceed rapidly by heating or maintaining the mixture of the organosiloxane with the acidic compound to or at a temperature of 20° to 100° C., preferably 20° to 80° C. If the temperature is below 20° C., the reaction rate is so low that the practicability is spoiled. If the temperature is above 100° C., on the other hand, a siloxane chain cutting reaction occurs with the undesirable result of formation of lower molecular weight siloxane.

The reaction generally takes place without addition of solvent, but a solvent may be used, as required. However, most uses of the organopolysiloxane obtained according to the process of this invention do not require the use of solvent, and, accordingly, it is desirable to use no solvent in the process, thereby avoiding waste of energy and loss of time in removal of solvent.

The reaction is carried out for a time ranging generally from several hours to one day, whereby an organopolysiloxane with the desired viscosity (molecular weight) can be obtained. The control of the reaction time, or the termination of the reaction, can be achieved easily by various methods. For example, where the starting material is a low boiling point compound, this purpose can be accomplished by distilling off the compound under a reduced pressure. Where the starting material is a high boiling point compound which is difficult to distill off under a reduced pressure, the purpose can be accomplished by adding a diluted alkali such as sodium carbonate, etc. to the reaction system, and agitating the reaction system to neutralize the acidic compound, followed by filtration.

After the reaction is finished, distillation under a reduced pressure is carried out to remove the acidic compound and by-produced water, whereby an organopolysiloxane with an increased molecular weight is obtained.

EXAMPLES

Example 1

An admixture of 100.5 g of a dimethylpolysiloxane blocked by hydroxyl group at both ends of its molecular chain and having a viscosity at 25° C. of 780 cSt with 1.0 g of an acidic compound represented by the formula:

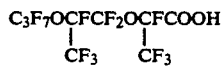

was left to stand at 20° C. for 24 hours, to yield a highly viscous oil with a viscosity of 235,000 cSt. The viscosity of the reaction product varied with time as shown in FIG. 1.

Examples 2 to 4, Comparative Example 1

Admixtures of 100.0 g of a dimethylpolysiloxane blocked by hydroxyl group at both ends of its molecular chain and having a viscosity at 25° C. of 760 cSt with 0.0015 mol each of the respective acidic compounds set forth in Table 1 were left to stand at 20° C. As a result, the respective reaction products exhibited variations in viscosity with time, as shown in Table 1.

The values of viscosity shown in Table 1, and in the subsequent tables, are all in centistokes (cSt).

TABLE 1

| Examples<br>Acidic compound<br>Reaction time (hr) | Comparative<br>Example 1<br>$C_3H_7COOH$ | Example<br>2<br>$Rf^2COOH^{1)}$ | Example<br>3<br>$Rf^3COOH^{2)}$ | Example<br>4<br>$HOOC-Rf^4-COOH^{3)}$ |
|---|---|---|---|---|
| 0 | 760 | 760 | 760 | 760 |
| 1 | 860 | 840 | 830 | 860 |

TABLE 1-continued

| Examples | Comparative Example 1 | Example 2 | Example 3 | Example 4 |
|---|---|---|---|---|
| 2 | 1,080 | 1,030 | 1,080 | 1,230 |
| 5 | 1,580 | 1,800 | 1,970 | 2,920 |
| 21 | 24,800 | 21,400 | 47,500 | 80,200 |
| 29 | 45,400 | 155,000 | 94,600 | 326,000 |
| 45 | 200,000 | 2,000,000 | 790,000 | 2,300,000 |

[1)] $Rf^2COOH$: $C_3F_7OCFCOOH$
                              |
                             $CF_3$

[2)] $Rf^3COOH$: $C_3F_7O(CFCF_2O)_2CFCOOH$
                               |              |
                             $CF_3$        $CF_3$

[3)] $HOOC-Rf^4-COOH$:
$HOOC-CFOCF_2CFOCF_2CF_2OCFCF_2OCF-COOH$
         |          |              |          |
       $CF_3$    $CF_3$         $CF_3$    $CF_3$

Examples 5 to 8

Admixtures of 100.0 g of a dimethylpolysiloxane blocked by hydroxyl group at both ends of its molecular chain and having a viscosity at 25°. of 760 cSt with 0.1 g, 0.5 g, 1.0 g and 3.0 g, respectively, of a fluorine-containing carboxylic acid represented by the formula:

$$C_3F_7OCFCOOH$$
$$|$$
$$CF_3$$

were left to stand at 20° C. As a result, the reaction products exhibited variations in viscosity with time, as shown in Table 2.

TABLE 2

| Examples | 5 | 6 | 7 | 8 |
|---|---|---|---|---|
| Amount of added $Rf^2COOH^{1)}$ (g) | 0.1 | 0.5 | 1.0 | 3.0 |
| Reaction time (hr) | | | | |
| 0 | 760 | 780 | 760 | 760 |
| 1 | 920 | 1,190 | 1,650 | 1,720 |
| 4 | 1,070 | 2,110 | 5,620 | 5,430 |
| 20 | 3,430 | 43,000 | 290,000 | 270,000 |
| 28 | 5,280 | 85,000 | 390,000 | 450,000 |
| 45 | 15,200 | 780,000 | 2,000,000 | 3,000,000 |

[1)] $Rf^2COOH$: $CF_3OCFCOOH$
                             |
                          $CF_3$

Examples 9 and 10

Admixtures of 100.0 g each of dimethylorganopolysiloxanes blocked by hydroxyl group at both ends of the molecular chain thereof and having respective viscosities at 25° C. as shown in Table 3 with 0.5 g of a fluorine-containing carboxylic acid represented by the formula:

$$C_3F_7OCFCOOH$$
$$|$$
$$CF_3$$

were left to stand at 20° C. Consequently, the reaction products exhibited variations in viscosity with time, as shown in Table 3.

The results of Example 6 are also shown in Table 3.

TABLE 3

| Examples | 6 | 9 | 10 |
|---|---|---|---|
| Diorganopolysiloxane blocked by hydroxyl group at both ends | Dimethylpolysiloxane | 3,3,-Trifluoropropylmethylpolysiloxane | Compound indicated below[(*)] |
| Reaction time (hr) | | | |
| 0 | 760 | 62,000 | 8,500 |
| 1 | 1,190 | 72,400 | 9,300 |
| 4 | 2,110 | 80,000 | 36,000 |
| 20 | 43,000 | 111,000 | 320,000 |
| 28 | 85,000 | 156,000 | 485,000 |
| 45 | 780,000 | 450,000 | 2,000,000 |

[(*)] $HO(SiO)_n(SiO)_mH$ with Me, Ph substituents
         Me  Ph
          |    |
$HO(SiO)_n(SiO)_mH$
          |    |
         Me  Ph wherein Me is the methyl group, Ph is the phenyl group, and n and m are each a positive integer.

Example 11

A mixture of 100 g of the same dimethylpolysiloxane (viscosity at 25° C.: 760 cSt as used in Example 2 and 0.5 g of an acidic compound represented by the formula:

$$C_3F_7OCFCOOH$$
$$|$$
$$CF_3$$

was agitated at 80° C. for 4 hours. As a result, a viscous matter having a viscosity (25° C.) of 5,300,000 cSt was obtained.

We claim:

1. A process for preparing a high molecular weight organopolysiloxane, which comprises subjecting an organosiloxane having at least one Si-bonded hydroxyl group in one molecule thereof to a condensation reaction in the presence of an acidic compound selected from the acidic compounds represented by the following general formulas (1) or (2) or mixtures thereof:

$$F-(CFCF_2O)_n-CFCOOH \qquad (1)$$
$$\quad\ \ |\qquad\qquad\quad\ |$$
$$\ \ CF_3\qquad\qquad CF_3$$

$$HOOC-(CFOCF_2)_l-(CF_2)_k-(CF_2OCF)_m-COOH \qquad (2)$$
$$\qquad\quad\ |\qquad\qquad\qquad\qquad\qquad\ |$$
$$\quad\ \ CF_3\qquad\qquad\qquad\qquad\ CF_3$$

wherein in the formulas n is an integer of from 1 to 10, k is an integer of from 0 to 8, and l and m are each an integer of 0 or above, with l+m being in the range from 1 to 10, in an amount of 0.001 to 10 parts by weight per 100 parts by weight of the organosiloxane.

2. The process according to claim 1, wherein the acidic compound comprises at least one compound selected from the group consisting of:

$$C_3F_7OCFCOOH, \quad C_3F_7O(CFCF_2O)_2CFCOOH,$$
$$\phantom{C_3F_7O}|\phantom{CFCOOH, \quad C_3F_7O(CF}|\phantom{CF_2O)_2}|$$
$$\phantom{C_3F_7O}CF_3 \phantom{CFCOOH, \quad C_3F_7O(}CF_3 \phantom{CF_2O)_2}CF_3$$

$$HOOCCFOCF_2CF_2OCFCOOH, \text{ and}$$
$$\phantom{HOOCC}|\phantom{FOCF_2CF_2OC}|$$
$$\phantom{HOOCC}CF_3 \phantom{FOCF_2CF_2O}CF_3$$

-continued
$$HOOCCFOCF_2CFOCF_2CF_2OCFCF_2OCFCOOH.$$
$$\phantom{HOOCC}|\phantom{FOCF_2C}|\phantom{FOCF_2CF_2OC}|\phantom{FCF_2OC}|$$
$$\phantom{HOOCC}CF_3 \phantom{FOCF_2}CF_3 \phantom{FOCF_2CF_2O}CF_3 \phantom{FCF_2O}CF_3$$

3. The process according to claim 1, wherein the acidic compound is used in an amount of 0.1 to 1.0 part by weight per 100 parts by weight of the hydroxyl-containing organosiloxane.

4. The process according to claim 1, wherein the condensation reaction is carried out at a temperature of to 100° C.

5. The process according to claim 4, wherein the condensation reaction is stopped by addition of diluted alkali to the reaction system.

* * * * *